United States Patent [19]

Czerwinski et al.

[11] 4,434,952
[45] Mar. 6, 1984

[54] POWER RETURNABLE COILABLE RULE CARTRIDGE AND COIL RULE ASSEMBLY EMPLOYING SAME

[75] Inventors: Frank G. Czerwinski, East Berlin; Edward C. Rutty, Portland, both of Conn.

[73] Assignee: The Stanley Works, New Britain, Conn.

[21] Appl. No.: 415,521

[22] Filed: Sep. 7, 1982

[51] Int. Cl.³ .................. B65H 75/48; G01B 3/10
[52] U.S. Cl. .................. 242/107; 33/138; 242/84.8
[58] Field of Search ........ 242/107, 107.2, 107.3, 242/84.8; 33/138, 139, 140

[56] References Cited

U.S. PATENT DOCUMENTS

| | | | |
|---|---|---|---|
| 3,689,004 | 9/1972 | Brown et al. | 242/107 |
| 3,716,201 | 2/1973 | West | 242/107 |
| 3,802,641 | 4/1974 | Saito | 242/107 |
| 4,067,513 | 1/1978 | Rutty et al. | 242/107.3 |
| 4,068,383 | 1/1978 | Krebs | 33/138 |
| 4,228,589 | 10/1980 | Chemay | 33/138 |

Primary Examiner—John M. Jillions

[57] ABSTRACT

A power returnable coilable rule employs a cartridge having a hub rotatably seated and trapped in apertures in the end walls of the spool. The hub has a multiplicity of tabs at each of its ends which interlock with bosses on the inside surfaces of the outer casing end walls so as to prevent relative rotation thereof. The power spring is attached at its inner end to the hub and at its outer end to the inner end of the coiled measuring blade. Prior to assembly in the rule casing, a retainer clip secures the blade and spring in predetermined condition on the spool. This clip has an arm overlying a spool end wall with means adjacent its inner end interengaged with the tabs of the hub, and a flange at its outer end which depends along the outer coil of the blade and interengages with the tape hook so that the opposing forces on its ends produced by the coiled spring maintain the retainer clip in assembly.

11 Claims, 5 Drawing Figures

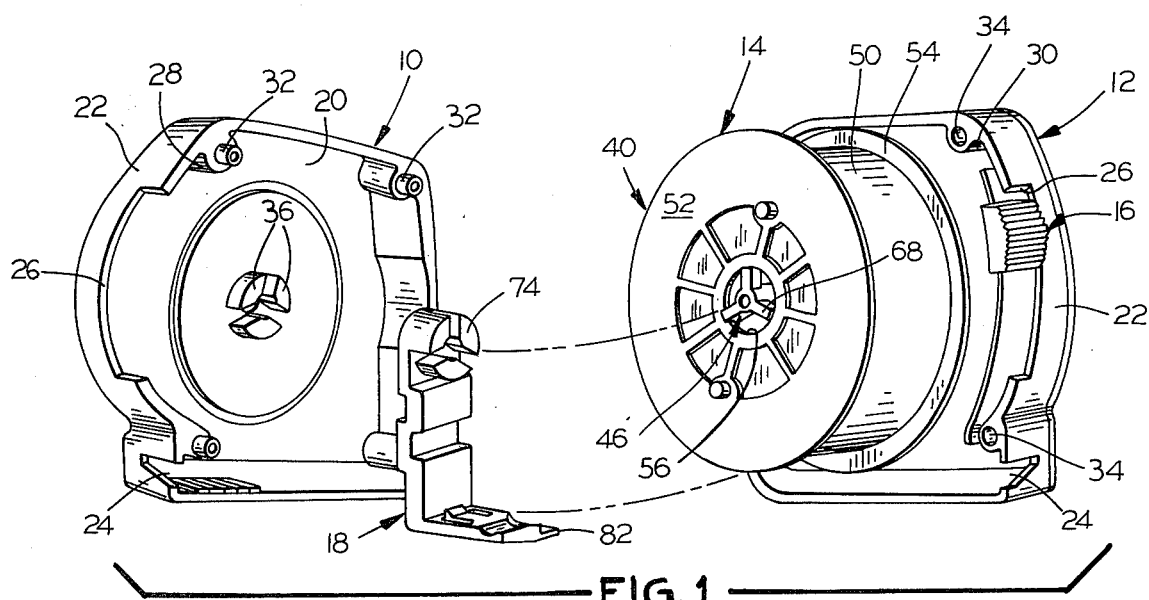
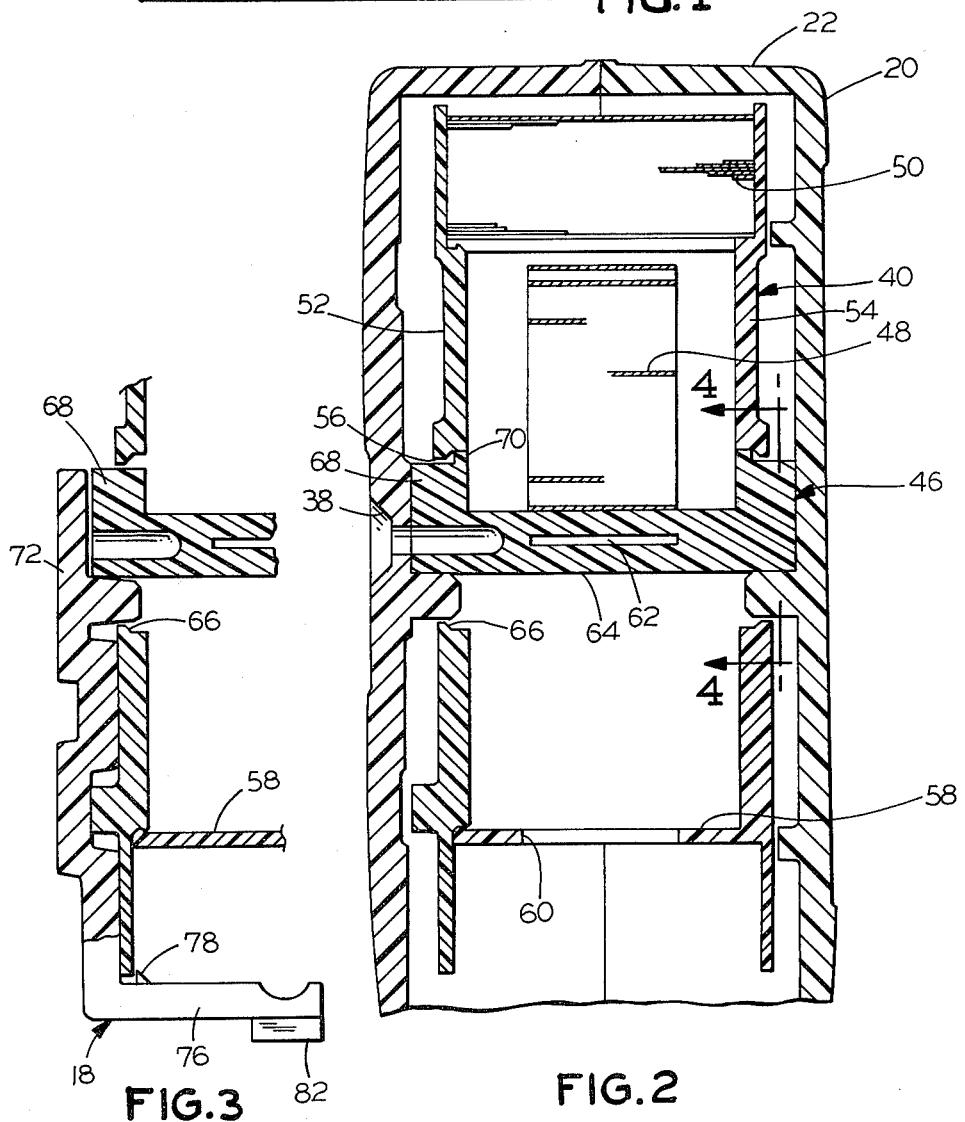
FIG. 1
FIG. 3   FIG. 2

POWER RETURNABLE COILABLE RULE CARTRIDGE AND COIL RULE ASSEMBLY EMPLOYING SAME

BACKGROUND OF THE INVENTION

The present invention relates to power returnable coilable rules of the type employing spools within which are wound the power return spring and coilable blade.

Power returnable coilable rules have proven highly advantageous and are presently widely employed. Because the measuring blades occasionally require replacement, such rule assemblies desirably permit the substitution of replacement cartridges.

Replacement cartridges heretofore have been widely utilized and are exemplified by those shown in Brown et al U.S. Pat. No. 3,689,004 granted Sept. 5, 1972; West U.S. Pat. No. 3,716,201 granted Feb. 13, 1973; and Rutty et al U.S. Pat. No. 4,067,513 granted Jan. 10, 1978. Although such replacement cartridges have been advantageously employed, some have required loose hubs, separate posts, relatively large diameter hubs or relatively expensive case or spool design.

It is an object of the present invention to provide a novel power returnable coilable rule utilizing a replaceable cartridge with a trapped internal hub engaged with the casing.

It is also an object to provide such a coilable rule in which the hub of the spool cartridge is of relatively small diameter to enhance the effectiveness of the return spring motor.

Another object is to provide a novel cartridge for a power returnable coilable rule employing a spool with a self-contained hub readily engageable by the casing in which it is to be mounted.

Still another object is to provide such a cartridge and a retaining clip assembly which securely retains the coiled spring and blade in the predetermined coiled condition and which may be readily disassembled.

SUMMARY OF THE INVENTION

It has now been found that the foregoing and related objects can be readily attained in a cartridge for a coilable rule which includes a form-sustaining spool having a cylindrical core portion with an axially extending aperture therethrough and annular end walls of greater diameter than the core portion to provide an annular chamber thereabout. The central apertures of the end walls are aligned and of lesser diameter than the core portion to provide a cylindrical chamber which has seated therewithin a hub having an elongate post extending axially of the spool and a multiplicity of locking tabs which extend outwardly from its ends and perpendicularly to its axis. These tabs are adapted to interlock with the housing in which the cartridge is placed to lock the hub against rotation therewithin. The tabs have lips which extend along the inner surface of the end walls about the central aperture and thereby retain the hub within the spool, but the hub is freely rotatable relative to the spool. Seated within the core portion of the spool is a power or recoil spring which has one end attached to the post of the hub, and a measuring blade is coiled about the core portion with its inner end secured to the outer end of the spring.

In the preferred embodiment, the tabs extend radially outwardly from the axis of the post, and the inner surface of each of the end walls of the spool has a circular shoulder about the central aperture upon which the tab lips are slidable. Desirably, the tabs project axially outwardly of the plane of the end wall of the spool.

The cartridge preferably includes a retainer having an arm extending along the outer surface of one of the end walls of the spool with its inner end portion overlying the hub and having means thereon interengaged with the tabs of the hub. The retainer also has a depending flange engaged with the coiled measuring blade to maintain the spring and blade in coiled condition. Desirably, the depending flange has an inwardly projecting finger portion thereon engaged under the edge of the end wall, and the blade has a hook with an aperture therein at its free end and the depending flange of the retainer has a laterally extending finger engaged in the hook aperture.

In the preferred assembly providing the coilable rule, the cartridge is seated in a housing having a pair of end walls and a sidewall defining a chamber therebetween, and its sidewall has an aperture extending therethrough. Locking means on the inner surfaces of the end walls of the housing interengage with the tabs of the hub to lock it against rotation therewithin. As is customary, the free end of the measuring blade extends outwardly of the aperture in the sidewall of the housing.

BRIEF DESCRIPTION OF THE DRAWINGS

FIG. 1 is a partially exploded view of a power returnable coilable tube embodying the invention and also illustrating the retainer for the cartridge, with the cartridge and retainer in reversed position for clarity of illustration.

FIG. 2 is a fragmentary transverse sectional view thereof drawn to an enlarged scale;

FIG. 3 is a fragmentary view of the cartridge and retainer assembly partially in section;

DETAILED DESCRIPTION OF THE ILLUSTRATED EMBODIMENT

Figure 4:
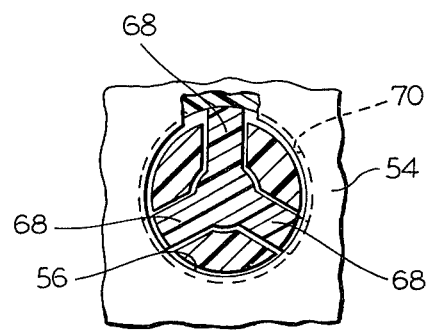
FIG. 4 is a fragmentary sectional view of the reel assembly with a portion of the spool end wall broken away.
Figure 5:
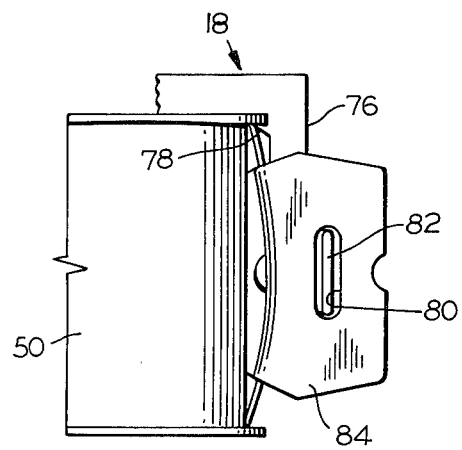
FIG. 5 is a fragmentary view of the blade hook and retainer showing the manner of interengagement.

Turning first to FIG. 1 of the attached drawings, a coilable rule embodying the present invention is generally comprised of a housing or a casing consisting of the mating halves generally designated by the numerals 10 and 12, the blade cartridge generally designated by the numeral 14, and the lock member generally designated by the numeral 16. Also shown is the retainer clip generally designated by the numeral 18 and which is used to secure the blade cartridge 14 in coiled condition prior to assembly in the housing halves 10, 12. Not shown are the conventional speed control cams or brakes of the type illustrated and described in Van Zelderen U.S. Pat. No. 3,889,897 granted Jan. 17, 1975.

Turning now in detail to the housing, each of the mating halves 10, 12 has an end wall 20 and a peripheral sidewall 22, and an elongated aperture 24 is provided in the sidewall 22 adjacent the intersection between its base portion and front portion and extends generally parallel to its base portion. Intermediate its ends the front portion of the sidewall 22 has an elongated aperture 26 which extends parallel to the planes of the end walls 20.

Bosses 28, 30 are formed on the inside surfaces of the halves 10, 12 adjacent the intersections of the several portions of the sidewall 22, and the bosses 28 of the housing half 10 have axially projecting cylindrical pins 32 which seat in cooperating cylindrical recesses 34 in the bosses 30 of the housing half 12. Threaded fasteners (not shown) seat in countersunk apertures (not shown) in the end wall 20 of the housing half 12 and threadably engage in the pins 32 when they are seated in the bosses 30 of that housing half so as to lock the components together. Each of the housing halves 10, 12 has at the center of the inner surface of its end wall 20 a multiplicity of equidistantly spaced segmented bosses 36, and the housing half 10 also has a centrally disposed countersunk aperture 38 extending therethrough.

Turning now to the cartridge 14, it includes a spool generally designated by the numeral 40 and comprised of a pair of mating sections, a hub rotatably seated therein and generally designated by the numeral 46, a coiled power or recoil spring 48 and a coiled measuring blade 50. The spool 40 has annular end walls 52, 54 with central apertures 56 therein and a cylindrical core 58 extending therebetween and of greater diameter than the central apertures 56. The inner surface of the cylindrical core 58 and of the end walls 52, 54 define a cylindrical chamber in which is disposed the coiled power spring 48, and the outer surface of the core 58 and the inner surfaces of the end walls 52, 54 define an annular recess in which is seated the coiled measuring blade 50.

As best seen in FIGS. 2 and 4, the inner surfaces of the end walls 52, 54 of the spool 40 have annular recesses 66 therein about the central apertures 56 to provide a bearing surface for the radially extending tabs 68 at the axial ends of the post portion 64 of the hub 46. The tabs 68 have radially extending lip portions 70 at their axially inner ends which overlie the recesses 66 and are slidable thereon to restrain the hub 46 from axial movement outwardly of the central apertures 56 of the spool 40.

In the illustrated embodiment, the axially outer ends of the tabs 68 are disposed outwardly of the planes of the end walls 52, 54. In assembly, the segmented bosses 36 on the end walls 20, 22 of the housing halves 10, 12 interlock with the tabs 68 to prevent rotation of the hub 46. Moreover, upon assembly a screw (not shown) extends through the countersunk aperture 38 in the housing half 10 into the hub 46 to enhance the security of the assembly.

To maintain the blade 50 and spring 48 in predetermined coiled and tensioned condition within the spool 40 as a preloaded cartridge before assembly in the casing, the retainer clip 18 is assembled upon the cartridge 14 intially and maintained thereon until its placement within the housing half 12, at which time the segmental bosses 36 on the end wall 20 will interlock with the tabs 68 of the hub 46 to prevent rotation of the hub. The free end of the blade 50 is led outwardly through the aperture 24 in the sidewall 12 when the clip 18 is removed. The hooked end of the blade 50 will limit its retraction inwardly of the housing under the action of the power spring 48. For convenience of illustration, the cartridge 14 and the clip 18 are shown in FIG. 1 in reversed position, the cartridge surface shown being normally disposed against the inner surface of the housing half 12.

The retainer clip 18 has an arm portion 72 with segmental bosses 74 at its inner end which interlock with the tabs 68 of the hub 46 to prevent its rotation relative thereto. At the outer end of the arm portion 72 is a depending flange 76 which extends along the outer surface of the cartridge 14 and its coiled blade 50. The flange 76 has an upwardly and inwardly projecting deflectable finger 78 which locks under the end wall 52 of the spool 40 to restrain the clip 18 against inadvertent movement. A laterally extending finger portion 82 on the flange 76 is spaced outwardly from the surface of the blade 50 and seats in the aperture 80 of the tape hook 84 to maintain the two elements in assembly since the power spring 48 will be acting on the hub 46 to effect its rotation in one direction and on the coiled blade 50 in the opposite direction. Thus, the opposing forces will maintain the clip 18 in assembly until the finger portion 82 is removed from the hook 84 and the flange portion 76 is pivoted upwardly.

Desirably, the assembly includes speed control cams of the type disclosed in Van Zelderen U.S. Pat. No. 3,889,897 and a brake mechanism fully described in West U.S. Pat. No. 3,214,836 granted Nov. 2, 1965.

As is conventional, the spool and hub are molded from synthetic resin, conveniently by injection molding. Similarly, the retainer clip may be injection molded. The resins from which such parts are molded include acrylonitrile/butadiene/styrene interpolymer (ABS), polyamides such as nylon, rubber modified polystyrene (HIPS), styrene/acrylonitrile copolymers (SAN), polypropylene, and the like.

The housing may also be molded from such resins, or it may be cast or forged from metal such as aluminum, steel, zinc and brass. The tape and spring will generally comprise tempered steel strip.

It will be appreciated that the provision of a self-contained hub in the spool eliminates the need for a separate center post on the mating halves of the housing. The post portion of the hub is a solid section to provide enhanced strength and the diameter of the post portion may be relatively small to increase the effectiveness of a given lineal length of spring in providing the spring power to return the blade to its coiled condition within the housing.

Moreover, the locking of the hub in the spool by its tabs provides a secure spool assembly and cartridge, and the multiplicity of spaced tabs interlocking with the multiplicity of bosses provides high resistance to torque stresses on the hub resulting from operation of the spring motor.

As will be appreciated, the trapped hub and spool assembly is readily engaged with the retainer clip to ensure retention of the coiled blade and spring in predetermined tensioned condition.

Thus, it can be seen that the coilable rules of the present invention provide a highly advantageous cartridge assembly employing a captive internal hub of relatively small diameter and high strength to enhance the effectiveness of the recoil spring motor. Moreover, the cartridges containing the prewound and tensioned spring and blade may be coupled with a readily fabricated retaining clip to provide a secure assembly of the elements in the predetermined tensioned condition for shipment and handling.

Having thus described the invention, we claim:
1. A cartridge for a coilable rule comprising:
A. a form-sustaining spool having a cylindrical core portion with an axially extending aperture therethrough and annular end walls of greater diameter than said core portion to provide an annular chamber thereabout, the central apertures of said end walls being aligned and of lesser diameter than said core portion;

B. a hub having an elongate post extending axially of said spool and a multiplicity of locking tabs extending outwardly from each end thereof and perpendicularly to the axis of said post, said tabs being adapted for interlocking with the housing in which said cartridge is placed to lock said hub against rotation therewithin, said tabs having lips extending along the inner surface of said end walls about said central aperture and thereby retaining said hub relative to said spool, said hub being freely rotatable within said spool;

C. a recoil spring coiled within said core portion having one end attached to said post; and D. a measuring blade coiled about said core portion having its inner end secured to the outer end of said spring.

2. The cartridge in accordance with claim 1 wherein said tabs extend radially outwardly from said post.

3. The cartridge in accordance with claim 2 wherein the inner surface of each of said end walls of said spool has a circular shoulder about said central aperture and said tab lips are slidable thereon.

4. The cartridge in accordance with claim 1 wherein said tabs project outwardly of the plane of the end wall of said spool.

5. The cartridge in accordance with claim 1 additionally including a retainer having an arm extending along the surface of one of said end walls with its inner end portion overlying said hub, said inner end portion having means thereon interengaged with said tabs of said hub, said retainer having a depending flange engaged with the coiled measuring blade to maintain said spring and blade in coiled condition.

6. The cartridge in accordance with claim 5 wherein said depending flange has an inwardly projecting finger portion thereon engaged under the edge of said one end wall.

7. The cartridge in accordance with claim 5 wherein said blade has a hook with an aperture therein at its free end and said depending flange of said retainer has its laterally extending finger engaged in said hook aperture.

8. A coilable rule comprising:

A. a housing having a pair of end walls and a sidewall defining a chamber therebetween, said sidewall having an aperture extending therethrough;

B. a form-sustaining spool seated in said chamber and having a cylindrical core portion with an axially extending aperture therethrough and annular end walls of greater diameter than said core portion to provide an annular chamber thereabout, the central apertures of said end walls being aligned and of lesser diameter than said core portion;

C. a hub having an elongate post extending axially of said spool and a multiplicity of locking tabs extending outwardly from each end thereof and perpendicularly to the axis of said post, said tabs being interengaged with locking means on the inner surfaces of said end walls of said housing to lock said hub against rotation, said tabs having lips extending along the inner surface of said end walls about said central aperture and thereby retaining said hub within said spool, said spool being freely rotatable about said hub;

D. a recoil spring coiled within said core portion having one end attached to said post; and E. a measuring blade coiled about said core portion having its inner end secured to the outer end of said spring and having its free end extending outwardly of said aperture in said sidewall of said housing.

9. The coilable rule of claim 8 wherein wherein said tabs extend radially outwardly from said post.

10. The coilable rule of claim 9 wherein the inner surface of each of said end walls of said spool has a circular shoulder about said central aperture and said tab lips are slidable thereon.

11. The coilable rule of claim 8 wherein said tabs project outwardly of the plane of the end wall of said spool.

* * * * *